United States Patent
Dewey, Jr.

[11] 3,731,110
[45] May 1, 1973

[54] LASER SYSTEM FOR PRODUCING WAVELENGTH-TUNABLE OPTICAL RADIATION

[75] Inventor: Clarence Forbes Dewey, Jr., Belmont, Mass.

[73] Assignee: Massachusetts Institute of Technology, Cambridge, Mass.

[22] Filed: July 12, 1971

[21] Appl. No.: 161,906

[52] U.S. Cl. ............... 307/88.3, 250/199, 331/94.5
[51] Int. Cl. ............................................... H01s 3/10
[58] Field of Search ............. 307/88.3; 331/94.5; 250/199

[56] References Cited

UNITED STATES PATENTS

| | | | |
|---|---|---|---|
| 3,371,265 | 2/1968 | Woodbury et al. | 307/88.3 |
| 3,597,624 | 8/1971 | Weiner | 307/88.3 |
| 3,636,356 | 1/1972 | Giordmaine | 307/88.3 |
| 3,636,474 | 1/1972 | DeMaria et al. | 331/94.5 |
| 3,435,373 | 3/1969 | Wolff | 331/94.5 |

*Primary Examiner*—Roy Lake
*Assistant Examiner*—Darwin R. Hostetter
*Attorney*—Thomas Cooch et al.

[57] ABSTRACT

A laser system for providing monochromatic optical radiation, the wavelength of which is tunable. The system employs two lasers, at least one of which is tunable, and one of which is a source of pumping energy for the other. The output of the pump laser is divided; one of the output beams is directed upon the laser medium of the second laser to serve as an optical pumping means therefor, and the other part is mixed in a nonlinear optical means with the output laser radiation from the second laser to produce wavelength-tunable radiation. In a preferred system, a Q-switched ruby laser is employed to pump a wavelength-tunable dye laser and an output from each is mixed in a phase-matched $LiNbO_3$ crystal to provide monochromatic wavelength-tunable radiation in the infrared region of the spectrum.

29 Claims, 1 Drawing Figure

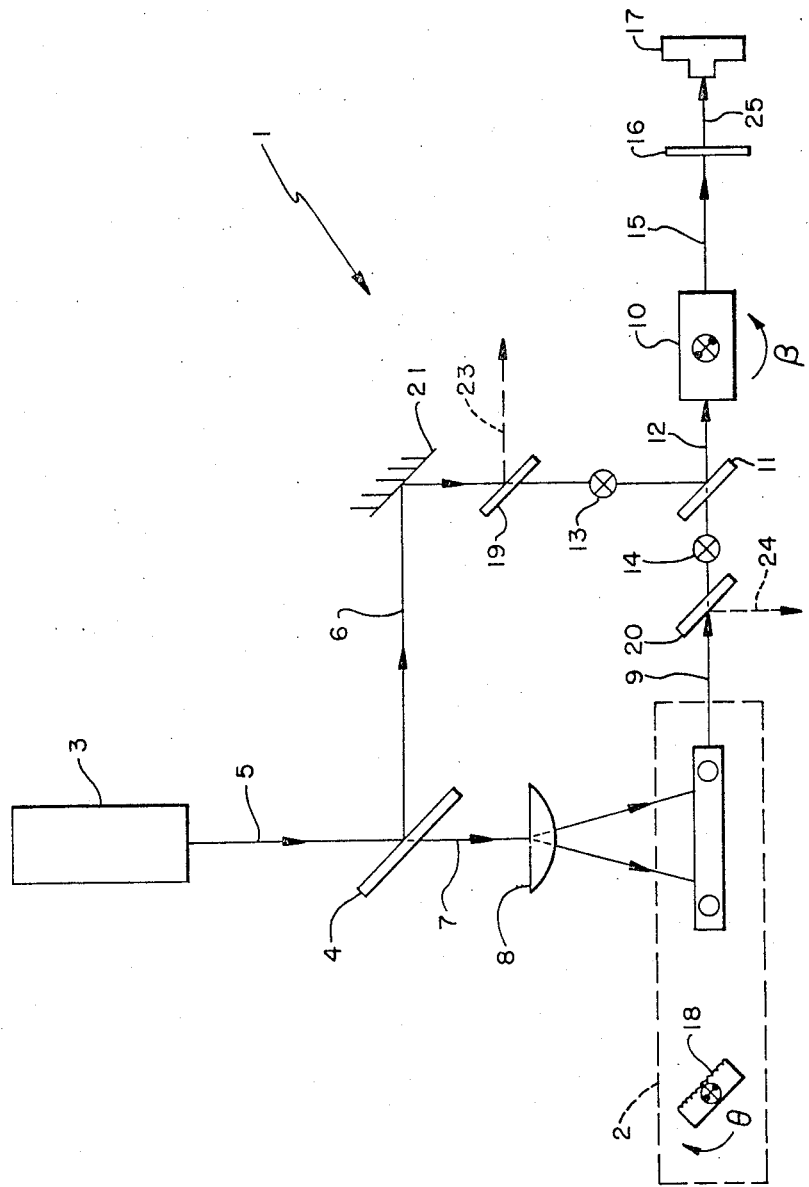

LASER SYSTEM FOR PRODUCING WAVELENGTH-TUNABLE OPTICAL RADIATION

The invention herein described was made in the course of work performed under a contract with the Advanced Research Projects Agency of the U.S. Department of Defense.

The present invention relates to a tunable laser system employing two lasers, at least one of which is tunable and one of which acts as a pump for the other, particularly, to a system wherein the pump laser radiation is split to provide two beams, one of which acts as a pump and the other of which is mixed in a non-linear optical material with output radiation from the other laser to provide an output which can be varied over a range of wavelengths.

Lasers, as sources of high-power monochromatic radiation, have been used in a wide variety of practical ways during the past decade. Most conventional laser systems operate at a fixed output wavelength, and as such are of very limited value in uses such as spectroscopy where the wavelength of the radiation must be adjusted to a precise value. The recent demonstration of organic dye lasers has established that wavelength-tunable radiation can be obtained using organic dye solutions as lasing media. (See for example, P.P. Sorokin et al., IBM Journal of Research and Development, Vol. 10, September, 1966, pages 401 et seq.). Such dyes have exhibited lasing action in the spectral region between 3,400 A and 10,600 A using a variety of different systems and dyes, but there is no reason to believe that the wavelength range cited above can be extended significantly further into the ultraviolet and into the infrared. Furthermore, the design of a conventional dye laser to cover a broad range of wavelengths becomes very difficult because of the large number of dyes which must be used, because of the stringent requirements which are placed on the performance of the optical elements, because some dyes required to cover the range cited are highly unstable, and because of the wide range of pumping radiation wavelengths which are required.

Tunable, high-power, monochromatic radiation in the infrared, visible, and ultraviolet regions of the spectrum is of great practical importance because of the ability of such radiation to interact selectively with atomic and molecular systems. A wide variety of uses exist, including analytical spectroscopy, molecular excitation, excitation of biological systems, initiation of chemical reactions and synthesis of chemical compounds, variable-wavelength optical communication, multiple-wavelength interferometry and holography, fluorescent displays using two-quantum excitation, and the establishment of non-equilibrium energy levels in atomic and molecular systems. One typical use of considerable interest recently is the possibility of using such radiation to detect contaminants in the atmosphere. Such contaminants can be identified by infrared spectroscopy by a process of "fingerprinting" contaminating molecules, which involves subjecting such molecules to radiation and noting the specific wavelengths at which the molecules absorb and re-emit radiation. Each type of bond between the atoms in a molecule responds to its own set of wavelengths. Thus, a laser system can be employed to direct a beam across a city, for example, to provide continuous monitoring of the atmosphere in that city. It has been found that wavelengths of particular interest are in 2 to 15 micron range. A laser employed for such use must be capable of sweeping a band of infrared frequencies to identify a number of contaminants or it must be capable of emitting at one very precise frequency to identify a single contaminant. Either situation rules out use of conventional lasers of substantially fixed wavelength output since it would be difficult, if not impossible, to find ones which emit at the precise frequencies required and, of course, continuous tuning across a band of frequencies is not possible using such lasers alone. Also, such lasers when used to measure, qualitatively and quantitatively, pollution in cities require fairly high intensity beams, thus ruling out the semiconductor lasers now being developed.

Accordingly, a principal object of the present invention is to provide a laser system capable of emitting radiation at some predetermined and precisely controlled frequency, one not available using conventional fixed-wavelength devices, and to provide a system capable of sweeping a predetermined band of frequencies.

A further object is to provide a system of the above character which can emit high intensity beams as for example to monitor pollution in cities.

In using systems for transmitting direct radiation across air spaces which are traversed by aircraft, there is danger of exposing persons to the radiation. A still further object, therefore, is to provide laser radiation of the above character in the form of pulses which, particularly in the infrared band, are of minimal danger to persons in the laser path but nevertheless contain sufficient energy to be useful for spectroscopic purposes.

Although the invention is described herein in connection with pollution detection, it has obvious value in other areas of spectroscopy as well, and for example may be employed to irradiate selectivity biological systems for sterilization in accordance with the teachings in an application for Letters Patent, Ser. No. 88,528 filed on Nov. 12, 1970, by George W. Pratt, Jr. Thus, another object is to provide a tunable laser system of general use to furnish very high intensity radiation which can be varied in frequency or which can be tuned to some frequency and then maintained at that frequency.

In utilizing conventional dye lasers to cover large regions of the visible and near-infrared spectrum, it has been found necessary to employ many different dyes and optical elements in different regions of the spectrum. Accordingly, a further object of the invention is to provide a system in which broad coverage of the spectrum may be achieved with fewer dyes, more stable dyes, and simpler optical elements, thus achieving increased economy, simplicity, reliability, and ease of operation.

A further object of the invention is to produce three high-intensity beams from the laser system, each of which is at a different wavelength than the other two, the three beams being synchronized in time.

A still further object of the invention is to provide a wavelength-tunable laser system, employing one pump laser and one variable-wavelength laser, in which the power of the variable laser is amplified by mixing a portion of the pump laser beam with the variable laser beam in a nonlinear crystal.

These and still further objects are further discussed hereinafter and are particularly delineated in the appended claims.

By way of summary, the foregoing objects are attained by a tunable laser system that includes, in combination, a first laser and a second laser, at least one of the lasers being tunable. Means is provided for receiving laser radiation from the second laser and for directing a portion of such radiation upon the first laser to serve as pump energy therefor. Other means is provided to direct output radiation from both said first laser and a further portion of the radiation from said second laser onto non-linear optical means whereby wavelength-tunable radiation is produced and appears as an output from the nonlinear optical means.

The invention will now be discussed in connection with the accompanying drawing, the single FIGURE of which is a schematic representation, in block diagram form, of a laser system capable of being tuned to a particular laser frequency and/or being swept through a band of frequencies.

Turning now to the drawing, a tunable laser system is shown generally at 1. The system includes first laser means 2 having a wavelength-tunable medium which, as later discussed herein, can be a liquid dye, a solid-solution fluorescent material, or the like. The laser 2 is pumped by second laser means 3 the laser radiation from which is designated 5; the laser 3 is a powerful source of laser radiation. The output 5 of the laser pump source 3 is divided by a beamsplitter 4 into two powerful beams 6 and 7. The beam 7 passes through a lens system 8 and acts as the source of pump energy for the laser 2 and the beam 6 is mixed with an output from the laser 2, as now discussed. The beam 6 is reflected by mirror 21 through a beamsplitter 19 and thence directed upon a dichroic mirror 11, as is, also, at least a portion of the radiation labeled 9 emitted by the tunable laser 2, and both laser beams, here designated 12, are directed upon a non-linear optical means 10 the output radiation from which, numbered 15, is directed through a filter 16 to a detector 17. The nonlinear optical means 10 (which can be, for example, crystals of $Ag_3AsS_3$; $Ag_3SbS_3$; $LiNbO_3$; ZnTe; or $LiIO_3$) acts to mix the various frequencies in the beam 12 to provide an output beam 15 which contains, in addition to residual radiation of beam 12, difference and sum frequencies of the two input frequencies. Since both the pump radiation 7 and the mixing radiation 6 are part of the same laser beam 5, and since dye solutions and other lasing media reach threshold very rapidly under powerful pumping, the beams 9 and 6 are synchronized in time which makes mixing possible.

The beamsplitter 19, a further beamsplitter 20 and the analyzing filter 16 are added for convenience and are not required for the basic operation of the laser system. The monitoring beams labeled 23 and 24 can, however, serve as feedback signals in connection with monitoring and controlling the output of the system. In a practical system, the mirror 21 may be replaced by a prism and the beamsplitter 4 may be a polarizing prism, Fabry-Perot etalon, multi-layer dielectric filter, polarization-selective electro-optical deflector, or partially-coated mirror. Other optical geometries for pumping the laser 2 may be used rather than the transverse geometry shown in the FIGURE, such as, for example, axial pumping of the laser medium or multi-phase excitation. Variable attenuators 14 and 13 may be employed, respectively, between the first and second lasers and the non-linear optical means each to receive output radiation from the respective laser and to adjust the intensity of such radiation independently prior to directing the same upon the non-linear optical means 10.

In an embodiment of the invention in connection with which the greatest amount of work has been done, the laser 3 is a Q-switched ruby laser producing several megawatts peak power over $10^{-8}$ seconds. Laser 2 contains a concentrated DTTC Iodide/DMSO dye solution in a transversely-pumped narrow-bore tube of 3 mm diameter. The wavelength of the beam 9 is changed from $0.84\mu$ to $0.89\mu$ by changing the angle designated $\theta$ of a diffraction grating 18. The grating is operated conveniently in a Littrow configuration. Methods of changing the output wavelength of laser 2 other than a diffraction grating may also be used; for example, a Fabry-Perot etalon may be employed or a series of refracting prisms arranged in series with a reflective mirror operating in Littrow or a wavelength-selective electro-optical filter in combination with a mirror operating in Littrow.

In the embodiment described herein, and in connection with which the experimental work was done, the nonlinear crystal 10 was $LiNbO_3$ oriented at an angle $\beta$ such that the difference frequency (which is in the infrared band) between the ruby and dye lasers was phase-matched according to the formula $$\beta_{IN} = \sin^{-1}\left[\frac{n_o^p - n_o^d + (n_o^d - n_o^i)(\lambda_p/\lambda_i)}{n_o^p - n_e^p}\right]^{1/2},$$

where $\beta_{IN}$ is the angle from the optic axis at which phase-matching occurs (as measured inside the crystal). The superscripts $(p,d,i)$ on the index of refraction, $n$, denote values at the pump, dye, and infrared wavelengths, respectively. Subscripts $o$ and $e$ refer to the ordinary and extraordinary indicies of refraction. The incident radiation made a single pass through the nonlinear crystal; the nonlinear crystal was not placed in an optical cavity. The experiment was conducted at ambient temperatures which were subject to random excursions of 3°–5°C, with no apparent effect on the stability of the output amplitude. The infrared wavelength is given by the expression $$(1/\lambda_{IR}) = (1/\lambda_{ruby}) - (1/\lambda_{dye\ laser}).$$

The wavelength of the output radiation was confirmed by observing the absorption of the beam in a polyethelene sheet at wavelengths between 3 and 4 microns and comparing the absorption spectrum thus obtained with an absorption spectrum obtained using a high-precision dual-beam spectrometer. Intense infrared pulses in excess of 6 kilowatts were produced.

It was also experimentally observed that the intensity of an infrared beam 25 emerging from the filter 16, which in this case was made of silicon, was linearly proportional to the intensity of the pumping beam 6 at high intensity of the dye laser beam 9, and that the intensity of beam 25 was not affected by substantial changes in dye laser output provided a minimum intensity of the beam 9 was maintained. The achievement of a linear relationship between the intensities of beams 6 and 25 is termed saturation. The demonstration of saturation in the experiment illustrates that the intensity of the beam produced by nonlinear mixing can be held closely constant by controlling the intensity of radiation appearing in the pump beam 6.

By employing Q-switched solid-state lasers such as ruby and Neodymium second harmonic, for example, as the pump source 3, large energies can be achieved using relatively slow (milliseconds) but high energy flash lamps as pumps for the laser 3. A portion of the energy thereby imparted over milliseconds can be extracted in 10-100 nanoseconds making this system intrinsically more powerful than a two-dye laser system. Since both the pump and the mixing radiation come from one source and, further, since the laser 2 follows within nanoseconds the output of the pump 3, asynchronism of the two mixing beams 6 and 9 is obviated.

It should be here noted that the non-linear mixing of beams 6 and 9 in the non-linear material 10, when said material is phase-matched to produce difference frequencies, also results in an amplification of the beam 9 which always has a longer wavelength than the beam 6. The system may therefore be used as a high-efficiency amplifier for the output of laser 2. In certain cases where the lasing medium of laser 2 is inefficiently excited by the pump laser 3, the invention herein described can achieve higher output powers in the beam 15 at the wavelength of laser 2 than would be possible when employing direct pumping of laser 2 by the entire pump beam 5.

It should be further noted that a variable-frequency laser may also be used as a pump laser. Such a system would be very useful if, for example, a flashlamp-pumped high-efficiency dye laser laser were used as the pump laser 3 and a fixed-frequency dye laser, solid-state laser, or semiconductor laser were used for laser 2.

In addition, the invention herein described is also capable of producing useful amounts of power at the sum frequency of the two beams entering the non-linear medium. For this purpose the non-linear medium should be phase-matched to favor the sum frequency described by the expression $$(1/\lambda_{sum}) = (1/\lambda_{pump}) + (1/\lambda_{dye\ laser}).$$

For example, by using a Neodymium second harmonic beam at 5,300 A and a dye laser operating at 5,800 A, ultraviolet radiation at 2,760 A can be produced. Nonlinear crystals such as ADP, KDP, KD*P and LiIO$_3$ are examples of nonlinear optical materials particularly useful for sum-frequency operation. A significant advantage of the invention described herein, in producing sum-frequencies, when compared to frequency doubling of a single laser beam, is that the relative angle between the pump laser and pumped laser beams may be adjusted to achieve a suitable angle for phase matching within the nonlinear medium. This can be achieved by replacing the mirror 21 and the dichroic mirror 11 by suitable reflective or other optical elements to direct said beams into the nonlinear medium 10 at an angle relative to each other. Such substitution is also possible in achieving difference-frequency generation.

By employing the teachings herein, it is possible to obtain a very intense, stable beam 15 for impinging upon the detector 17 or for the other purposes discussed. In addition to the uses before mentioned, the apparatus herein disclosed can be employed in certain specialized situations such as, for example, in multi-photon excitation of molecular systems and in multiple-wavelength interferometry for which it is useful to have more than one wavelength of high-intensity light available. The beam 15 emerging from the non-linear optical means 10 contains powerful directed radiation at three different wavelengths; one the wavelength of pump laser 3, one the wavelength of laser 2, and one at the sum or difference frequency produced by the nonlinear optical mixing in the non-linear optical means 10. The three related beams are, therefore, particularly suited for such molecular excitation. A number of alternate elements have been discussed, but several more variations are possible. Thus, by way of illustration, the pump laser can be a ruby second-harmonic beam, or other lasers such as pulsed nitrogen lasers, Xenon, Argon and other ion lasers, and powerful semiconductor lasers. The term "optical" as used herein denotes radiation in a range from ultraviolet to far infrared.

Modifications of the invention herein disclosed will occur to persons skilled in the art.

What is claimed is:

1. A tunable laser system that comprises, in combination, a liquid dye laser, a ruby laser, means for dividing laser radiation from the ruby laser into a first beam and a second beam and directing said first beam upon the dye laser to serve as pump energy therefor, and nonlinear crystal means to receive output radiation from the dye laser and said second beam to generate a difference frequency produced by the ruby and dye laser, said ruby laser having means to effect pulsing thereof to produce high peak power pulses and said dye laser being adapted to lase rapidly following excitation thereof, whereby the radiation bursts of said second beam and said dye laser are substantially overlapped in time within the non-linear crystal.

2. A laser system as claimed in claim 1 in which the means for dividing the radiation from the ruby laser is a beam splitter.

3. A laser system as claimed in claim 1 in which the non-linear crystal means is LiNbO$_3$.

4. A laser system as claimed in claim 1 which includes a dichroic mirror positioned to receive a portion of the output of the ruby laser as well as the laser output of the dye laser and to direct both upon the non-linear crystal means.

5. A laser system as claimed in claim 1 in which the liquid dye laser has an optical cavity that includes a diffraction grating to effect wavelength tuning thereof.

6. A tunable laser system that comprises, in combination, first laser means having an independently wavelength tunable laser media, second laser means acting as a pump source for the first laser means, the first and second laser means being operable to provide high intensity laser beams the frequencies of the beams being such that their difference is an infrared frequency, means for dividing the laser radiation from the second laser means into a first beam and a second beam and directing said first beam to provide pump energy to the first laser means, and nonlinear optical means positioned to receive a portion of said second beam and a portion of the laser radiation emitted by the first laser means as an input thereto and operable to provide an output therefrom at said infrared frequency.

7. A tunable laser system that comprises in combination: a first laser and a second laser, at least one of the lasers being independently tunable, means for dividing laser radiation from said second laser into a first beam and a second beam and directing said first beam upon said first laser to serve as pump energy therefor, non-linear optical means, means to direct both said second beam and output radiation from said first laser onto the non-linear optical means whereby wavelength-tunable sum and difference frequency radiation is produced.

8. A laser system as claimed in claim 7 in which said second laser is a solid state laser.

9. A laser system as claimed in claim 7 in which said first laser is a dye laser.

10. A laser system as claimed in claim 7 in which the means for dividing the radiation from the second laser is a beam splitter.

11. A laser system as claimed in claim 7 which includes a dichroic mirror positioned to receive said second beam as well as the laser output of the first laser and to direct both upon the non-linear optical means.

12. A laser system as claimed in claim 7 in which the first laser has a wavelength selective element to effect tuning thereof.

13. A laser system as claimed in claim 7 that includes means for Q-switching said second laser.

14. A laser system as claimed in claim 7 in which said second laser is a dye laser.

15. A laser system as claimed in claim 7 in which said second laser is a Xenon laser.

16. A laser system as claimed in claim 7 in which said second laser is an Argon laser.

17. A laser system as claimed in claim 7 in which the lasing medium of the first laser is a solid-solution fluorescent material.

18. A laser system as claimed in claim 7 in which said second laser is a semiconductor laser.

19. A laser system as claimed in claim 7 in which the means for dividing the radiation from the second laser is a wavelength selective element which divides the radiation into said first beam and said second beam, the second beam being the more monochromatic.

20. A laser system as claimed in claim 7 in which a wavelength-selective element is used to separate the different wavelength radiation emerging from the non-linear optical means.

21. A laser system as claimed in claim 20 in which the wavelength-selective element is made of Si.

22. A laser system as claimed in claim 7 in which said second laser is a semiconductor laser which is tunable in response to at least one of changes in temperature, pressure, magnetic field and optical cavity wavelength.

23. A laser system as claimed in claim 7 in which said second laser is an optically-pumped semiconductor laser, which is tunable in response to at least one of changes in temperature, pressure, magnetic field, and optical cavity wavelength selector.

24. A laser system as claimed in claim 7 in which the non-linear optical means is $Ag_3AsS_3$.

25. A laser system as claimed in claim 7 in which the non-linear optical means is $Ag_3SbS_3$.

26. A laser system as claimed in claim 7 in which the non-linear optical means is ZnTe.

27. A laser system as claimed in claim 7 in which the non-linear optical means is $LiIO_3$.

28. A laser system as claimed in claim 7 that includes attenuator means between each of the first and second lasers and the nonlinear optical means to receive output radiation from each of the lasers and to adjust the intensity of such radiation prior to directing the radiation upon the non-linear optical means.

29. A tunable laser system that comprises, in combination:
first laser means and second laser means, at least one of the laser means being tunable, the first laser means being adapted to be pumped by the second laser means, means directing a portion of output radiation from the second laser means upon the first laser means to serve as pump energy therefor, nonlinear optical means, means directing output radiation from both said first laser and a further portion of the radiation from said second laser onto the non-linear optical means whereby wavelength-tunable radiation is produced, said first laser means being a dye laser, said second laser means being a ruby laser, and said non-linear optical means being $LiNbO_3$.

* * * * *